United States Patent [19]

Risley

[11] Patent Number: 4,552,398

[45] Date of Patent: Nov. 12, 1985

[54] TRACTOR-TRAILOR BRAKE ACCELERATION SYSTEM

[75] Inventor: John R. Risley, Fort Wayne, Ind.

[73] Assignee: International Harvester Company, Chicago, Ill.

[21] Appl. No.: 570,135

[22] Filed: Jan. 12, 1984

[51] Int. Cl.$^4$ .............................................. B60T 15/46
[52] U.S. Cl. ............................................ 303/7; 303/47
[58] Field of Search ................................ 303/7, 40, 47

[56] References Cited

U.S. PATENT DOCUMENTS 4,109,968 8/1978 Wood ................................ 303/47 X

*Primary Examiner*—Duane A. Reger

*Attorney, Agent, or Firm*—Dennis K. Sullivan; F. David AuBuchon

[57] ABSTRACT

A brake activation system for reducing the time between the brake application of tractors and trailers utilizes a speed differential between the electrical and air signals. The application of the tractor brake actuates simultaneously a stop light circuit and the air brake systems. The electrical signals from this energized stop light circuit actuates solenoid valve which releases the air from the trailer reservoir being subsequently reduced to a predetermined low pressure level. This low pressure air reaches the trailer wheel brake chambers prior to the arrival of the brake air with high pressure overriding the low pressure air route and completing the trailer brake application.

2 Claims, 1 Drawing Figure

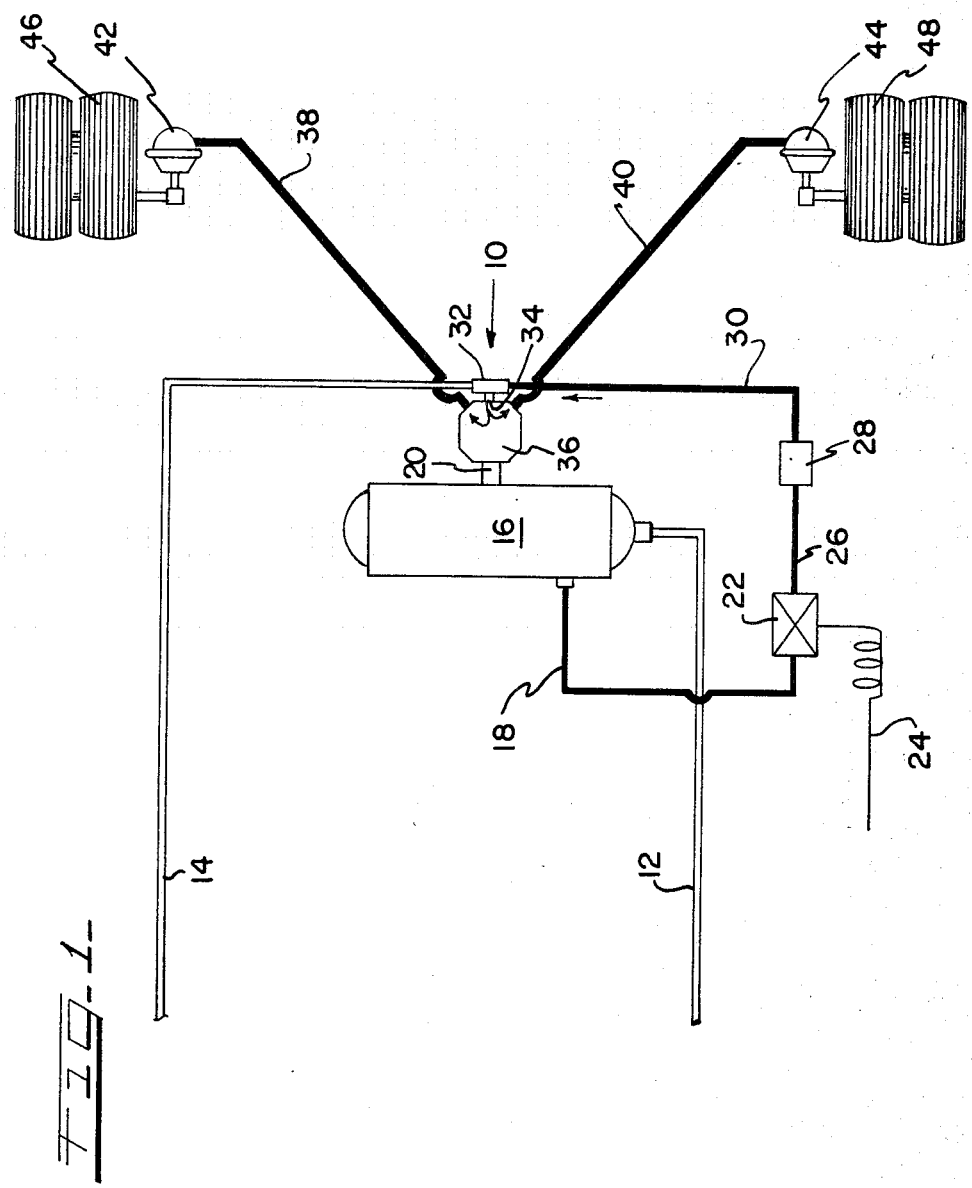

TRACTOR-TRAILOR BRAKE ACCELERATION SYSTEM

BACKGROUND OF THE INVENTION

1. Field of the Invention

This invention pertains to tractor-trailer brake systems and more particularly to the timing between the application of the tractor and trailer brakes.

INFORMATION DISCLOSURE STATEMENT

The problem of timing associated with the highway trains is getting the response signal to travel down the entire length of the train so that the brakes of all train units activate within a reasonable time. Although the problem of the response time is sometimes compensated for by the application of booster valves on each of the dollies, it creates another problem of air pressure imbalance along the length of the system. This pressureimbalance diminishes overall brake and efficiency and affects the life and effectiveness of the foundation brake system. In effect, the air pressure train imbalance leads directly to uneven brake lining wear and premature failure of drums and other components in the wheel assembly due to heat build-up in the tractor and first trailer. The problems inherent in such a set-up are obvious, including run-ins, loss of control, and reduced brake life.

Heretofore, various attempts have been made to solve this problem. For instance, a valve specifically designed for multiple unit vehicles which "boosts" the response signal along the entire train and allows for immediate release has been designed by the Bendix Corporation. The Bendix valve is designed to eliminate air pressure drop as the service signal travels the length of the highway train. However, this valve utilizes the same signal medium such as air, which is inherently slow relative to other signal transmitting media.

The subject invention discloses a novel approach to solving the delayed response signal travelling down the entire length of the rain, as shown and described hereinbelow.

SUMMARY OF THE INVENTION

According to the present invention, a brake activation system reducing a brake application time delay throughout a multiple unit vehicle train comprises a tractor brake system coupled with a trailer brake assembly via brake medium transmitting means. Time for building up the pressure in the trailer axle brake chambers is reduced due to the speed differential between the signal transmitting systems utilized herein.

BRIEF DESCRIPTION OF THE DRAWINGS

FIG. 1 is a schematic illustration of the tractor-trailer brake acceleration system.

DESCRIPTION OF THE PREFERRED EMBODIMENT

The invention may be carried into practice in a numbers of ways but one specific embodiment will be described by way of example only.

Referring now to the drawing wherein the reference characters designate like or corresponding parts throughout the complete view, there is shown in FIG. 1 a tractor-trailer brake acceleration system 10. The system 10 utilizes a principle that electric signals travel faster than pneumatic signals. Most of the conventional tractors and trailers utilize a compressed air brake system actuated by the air impulses or signals. The desireable objective of having the trailer brakes to simultaneously apply with the tractor brakes, thus reducing tendency for a rig to "jackknife". The subject air brake synchronization system is addressed to this problem. The air control lines 12 and 14 extending from a tractor, such as a truck, to a trailer air brake system. The line 12 is connected to the trailer air reservoir 16. From the reservoir 16 the air may exit through the lines 18 and 20. A solenoid relay valve 22 connected to the line 18 is actuated by the stop light circuit 24 of the tractor brake system in order to release the air from the trailer air reservoir 16 through the line 18. After the air is released from the reservoir 16, it passes through the air line 26 to a pressure reducing valve 28. The valve 28 permits a predetermined level of low pressure air to pass through the line 30 into a double check valve 32. From the check valve 32 the air passes through the line 34 to the service brake control port of the relay valve 36. This air signal to the relay valve 36 causes a flow of low pressure air to the brake lines 38 and 40 leading to the brake chambers 40 and 42 which operatively retard the movement of the wheels 46 and 48. This air signal of low pressure air to the brake chambers occurs before the service brake air signal is transmitted through the trailer higher pressure air line 14. When the service brake air signal pressure in line 14 exceeds the predetermined "in-shot" pressure from the pressure limiting valve 28, the double check valve 32 will shuttle, thus isolating the pressure reducing valve 28 and the solenoid relay valve 22 from the system. This permits normal modulation of service brake control pressure through the trailer relay valve 36.

The advantage of this device is that the brake chambers begin to fill with air, while the service brake air signal is being transmitted to the trailer relay valve, instead of conventional lack of the air flow to the brake chambers until the service brake signal reaches the trailer relay valve. Thus, the time delay between tractor brake and trailer brake application is reduced, and brake and contactability of the combination is enhanced.

It should be understood that this principle can be employed on any conventional air brake system using a pneumatic relay valve to improve brake application time. The system utilizes all existing elements of the conventional tractor-trailer brake systems. The stop light circuit of the tractor is energized on conventional tractor brake systems regardless of the air brake application. Utilizing the speed differential between electrical and air signals reduces the brake application time between tractors and trailers. The electrical signal transmitted by the application of the brake pedal and activation of the stop light circuit triggers the release of low pressure air from the reservoir 16 via solenoid valve 22 and pressure reducing valve 28 to deliver this low pressure air to the brake chambers 42 and 44 through the lines 38 and 40. This preliminary supply of the brake air before arriving of the high pressure air signal through the service line 14 reduces the time for trailer brake application to the wheels 46 and 48.

While one embodiment of the invention has been illustrated and described herein various changes and modifications may be made therein without departing from the spirit of the invention as defined by the scope of the appended claims.

What is claimed is:

1. In a pneumatic trailer brake system of the type actuated by a pneumatic signal from the brake system of an associated tractor, said trailer brake system including pneumatically actuable brakes on the trailer, an air reservoir, a pneumatic relay valve connected to the reservoir and having at least one service outlet connected to said trailer brakes and a control inlet pneumatically connected with said tractor to receive said pneumatic signal therefrom, the improvement comprising:

an electrically actuated valve pneumatically connected to said reservoir and electrically connected with said tractor for actuation upon actuation of said tractor brake system;

a pressure reducing valve pneumatically connected in series with said electrically actuated valve and having an outlet pressure substantially less than said pneumatic signal from said tractor; and a shuttle valve having a first input port pneumatically connected with said tractor brake system to relieve said pneumatic signal, a second input port pneumatically connected to the outlet pressure of said pressure reducing valve, and an outlet port connected to said control inlet of said relay valve, said shuttle valve providing exclusive pneumatic communication between the input port thereof experiencing higher pressure and said relay valve.

2. The invention in accordance with claim 1 and said electrically actuated valve being energized to be open whenever said tractor brake system is providing braking effort therefor.

* * * * *